United States Patent
Saccomanno, III

(10) Patent No.: US 9,511,423 B2
(45) Date of Patent: Dec. 6, 2016

(54) ADAPTER ENABLING SMALL DRAW-TYPE COLLET TO OPERATE AS STATIONARY-TYPE COLLET IN LARGE LATHE SPINDLE SLEEVE

(71) Applicant: Masa Tool, Inc., Oceanside, CA (US)

(72) Inventor: Matthew Saccomanno, III, Oceanside, CA (US)

(73) Assignee: MASA TOOL, INC., Oceanside, CA (US)

( * ) Notice: Subject to any disclaimer, the term of this patent is extended or adjusted under 35 U.S.C. 154(b) by 190 days.

(21) Appl. No.: 14/088,231

(22) Filed: Nov. 22, 2013

(65) Prior Publication Data

US 2015/0145219 A1    May 28, 2015

(51) Int. Cl.
   *B23B 31/26*    (2006.01)
   *B23B 31/20*    (2006.01)

(52) U.S. Cl.
   CPC .............. *B23B 31/207* (2013.01); *B23B 31/26* (2013.01); *B23B 31/265* (2013.01);
   (Continued)

(58) Field of Classification Search
   CPC .... B23B 31/207; B23B 2231/04; B23B 31/26; B23B 31/265; Y10T 279/17521; Y10T 279/17341; Y10T 279/1266; Y10T 279/3406
   (Continued)

(56) References Cited

U.S. PATENT DOCUMENTS

| 2,374,769 | A | * | 5/1945 | Musante | ............... B23B 31/003 |
| | | | | | 279/155 |
| 2,475,519 | A | * | 7/1949 | Robichaud | ............ B23B 31/207 |
| | | | | | 279/50 |

(Continued)

FOREIGN PATENT DOCUMENTS

WO    WO8807904 A1    10/1988

OTHER PUBLICATIONS

Hardinge Installation Booklet for Dead-Length Collet Adaptation Chucks Stationary Collet, Hardinge, Aug. 2001. Retrieved from www.hardingeus.com/usr/pdf/collet/B112.pdf.

(Continued)

*Primary Examiner* — Eric A Gates
*Assistant Examiner* — Paul M Janeski
(74) *Attorney, Agent, or Firm* — Charles F. Reidelbach, Jr.

(57) ABSTRACT

A collet adapter operates a draw-type collet in an axially stationary mode in a machine spindle that would otherwise operate with a stationary collet. The machine spindle has an axially stationary outer portion including a cap nut and an axially movable sleeve inside the axially stationary portion. The collet adapter includes an adapter body and a restraining apparatus. The adapter body has an outside surface that fits into the axially movable sleeve such that adapter body moves axially with the axially movable sleeve. The adapter body has an inside surface that receives the draw-type collet in sliding engagement. The restraining apparatus is configured to transmit an axial force from the stationary cap nut to a rearward portion of the draw-type collet to restrain axial motion of the draw-type collet. As a result of this axial constraint forward and backward motion of the axially movable sleeve closes and opens the collet respectively (Continued)

through the sliding engagement between the collet and the inside surface of the adapter body.

21 Claims, 7 Drawing Sheets

(52) U.S. Cl.
CPC ..... *B23B 2231/04* (2013.01); *Y10T 279/1266* (2015.01); *Y10T 279/17341* (2015.01); *Y10T 279/17427* (2015.01); *Y10T 279/17521* (2015.01); *Y10T 279/3406* (2015.01)

(58) Field of Classification Search
USPC .......................................................... 279/50
See application file for complete search history.

(56) References Cited

U.S. PATENT DOCUMENTS

| | | | |
|---|---|---|---|
| 2,478,195 A | | 8/1949 | Hull |
| 2,545,628 A | * | 3/1951 | O'Connell ............ B23B 31/202 |
| | | | 279/50 |
| 3,049,037 A | * | 8/1962 | Lakins .................. B23B 31/207 |
| | | | 82/147 |
| 3,921,993 A | * | 11/1975 | Ingham ................. B23B 31/207 |
| | | | 279/137 |
| 4,477,095 A | * | 10/1984 | Atkinson, III ........ B23B 31/001 |
| | | | 279/145 |
| 4,602,798 A | * | 7/1986 | Wettstein .............. B23B 31/201 |
| | | | 279/143 |
| 5,431,416 A | | 7/1995 | Thornton |
| 5,480,164 A | | 1/1996 | Murphy |
| 5,524,909 A | | 6/1996 | Wyatt |
| 5,549,308 A | | 8/1996 | Bennett |
| 5,806,859 A | * | 9/1998 | Saccomanno, III .. B23B 31/207 |
| | | | 279/143 |
| 5,855,377 A | * | 1/1999 | Murphy ................ B23B 31/201 |
| | | | 279/50 |
| 6,155,576 A | | 12/2000 | Yorde |
| 6,257,595 B1 | * | 7/2001 | Difasi .................. B23B 31/113 |
| | | | 279/50 |
| 6,554,288 B2 | | 4/2003 | Tomoni |
| 6,640,679 B1 | | 11/2003 | Roberts, Jr. |
| 6,832,433 B2 | | 12/2004 | Kramer |
| 6,854,741 B2 | | 2/2005 | Lopez |
| 7,331,585 B2 | | 2/2008 | Lindstrom |
| 7,717,771 B1 | * | 5/2010 | Lyerly .................... B23B 31/20 |
| | | | 279/46.3 |
| 7,758,289 B2 | | 7/2010 | Haimer et al. |
| 2005/0087936 A1 | * | 4/2005 | Dunner ................. B23B 31/202 |
| | | | 279/43 |
| 2010/0253016 A1 | | 10/2010 | Terwilliger et al. |
| 2014/0346742 A1 | * | 11/2014 | Theubet ................. B23B 31/20 |
| | | | 279/43.1 |

OTHER PUBLICATIONS

International Search Report and Written Opinion of the International Searching Authority for PCT Application No. PCT/US2014/066932 dated Mar. 4, 2015.

* cited by examiner

ADAPTER ENABLING SMALL DRAW-TYPE COLLET TO OPERATE AS STATIONARY-TYPE COLLET IN LARGE LATHE SPINDLE SLEEVE

FIELD OF THE INVENTION

The invention relates to lathe components and particularly to the mechanical interface between a collet and a lathe spindle. More particularly, the invention relates to an adapter that enables a small draw-type collet to be operated as an axially stationary collet having a spindle sleeve that is ordinarily utilized with a larger axially stationary-type collet.

BACKGROUND

A lathe is a rotational metal machining tool that is commonly used in manufacturing and prototyping articles having a degree of cylindrical symmetry prior to other processes. The lathe includes a spindle and a cutting tool. An article to be machined, referred to as a workpiece, is securely mounted in the spindle. The spindle then spins, rotating the workpiece. The cutting tool is then manipulated to impinge upon the workpiece whereby it makes circular cuts into the workpiece. Mounting and manipulation of the cutting tool is used to control a cylindrical cut geometry that defines resultant geometrical modifications of the article by the lathe.

The subject of this invention relates to the spindle and an adaptive apparatus for mounting the workpiece in the spindle. Spindles come with work-holding apparatuses of various types including jaw-type chucks and collets. A collet is typically used for a small to medium sized workpiece. Collets come in various types including draw-in collets, stationary collets, and expanding collets. This invention relates to the draw-in and stationary collets. The following discussion concerning FIGS. 9A and 9B will be helpful in understanding the invention.

For future descriptions the terms forward and rearward are used. Forward always refers to an axial direction (along the axis of spindle rotation) out of the spindle. Rearward always means the opposite of forward. To illustrate this convention a workpiece is inserted into a collet in the rearward direction and removed in the forward direction.

FIG. 9A illustrates a cross-sectional view of a spindle 100 including an axially stationary spindle sleeve 102 and draw-in collet 104. After a workpiece is placed in collet 104 a draw tube 106 attached to collet 104 pulls collet 104 rearward (to the left in the figure, into the spindle). As this happens, a flared zone of sleeve 102 bears radially inwardly upon a similarly flared zone of collet 104 in order to close collet 104 upon the workpiece. The sleeve 102 remains axially fixed while the collet 104 is pulled axially in a rearward direction. The process of closing a draw-in collet 104 has an axial positional component that decreases accuracy in axial location.

FIG. 9B illustrates a cross sectional view of a spindle 200 including an axially movable spindle sleeve 202 and a stationary collet 204. Surrounding the axially movable spindle sleeve 202 is a fixed portion 206 of spindle 200 including cap nut 208. After a workpiece is placed in collet 204, the spindle sleeve 202 moves forward. As this happens, a flared zone of sleeve 202 bears radially inwardly upon a similarly flared portion of collet 204 in order to close collet 204 to provide clamping force upon the workpiece. During this process collet 204 remains stationary, being held in place by cap nut 208 which is part of the fixed portion 204 of spindle 200. In contrast to the draw-in collet, the stationary collet closure does not have an axial positional component. Because of this, stationary collets are preferable for some manufacturing operations and for machining that requires high axial precision.

Lathes are generally used in fabricating articles having a wide range of diametrical sizes. The size of the spindle generally correlates with the maximal diameter of a workpiece. This invention concerns a need to fabricate relatively small articles such as small mechanism components and dental implants. Ideally smaller lathes are used for smaller parts. However there are economical and delivery rate reasons why a shop would like to be able to use larger lathes for small parts. For example, if a shop has a number of currently under-utilized larger lathes, an order for smaller articles can be accomplished more quickly if all the idle lathes can be used.

There is also a motivation to be able to machine a small workpiece as close as possible to an axial location at which the workpiece is supported by the collet. When conventional stationary collets are used the distance between axial collet support and machining may become too large such that the workpiece is not adequately supported. The spindle cap design generally used for stationary collets is inherently bulky in diameter and also necessitates an axial extension of the work zone away from the flared clamping area. These aspects degrade workpiece clamping force at the point of machining and necessitate the extension of cutting tools, which reduces strength, rigidity, and accuracy. What is needed is a way of machining such a small diameter workpiece very close to the support zone.

DETAILED DESCRIPTION OF THE PREFERRED EMBODIMENTS

Figure 1:
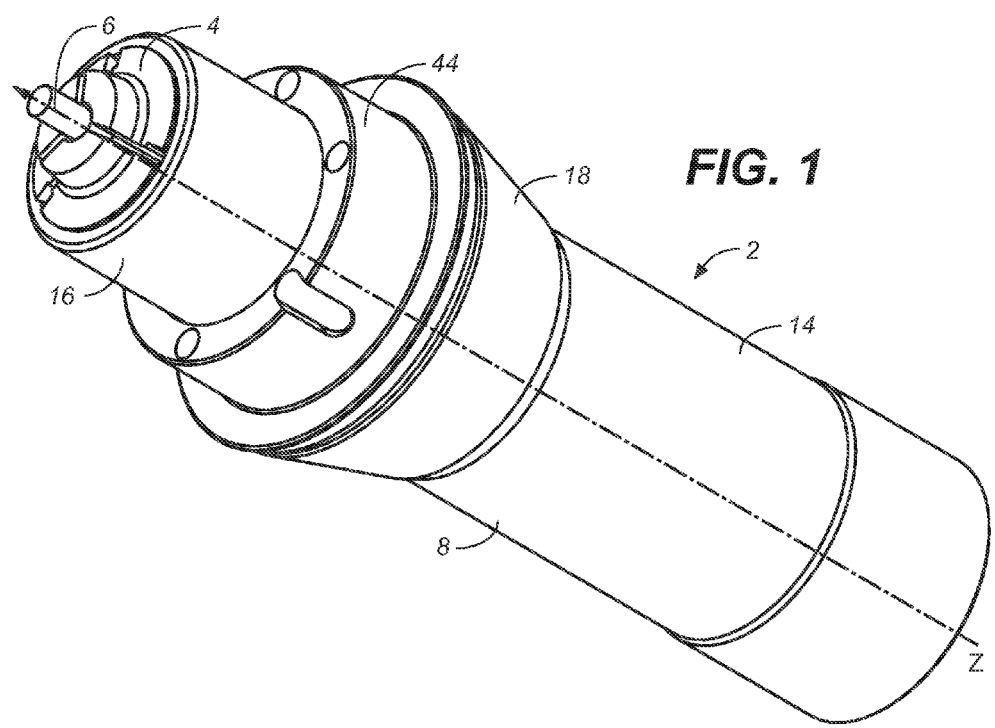
FIG. 1 is an isometric view of a collet adapter 2 with a collet 4 installed.
Figure 2:
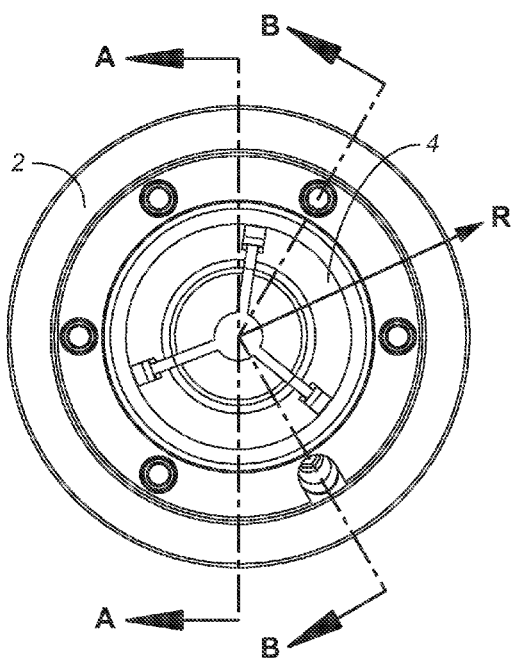
FIG. 2 is a front view of a collet adapter 2 with a collet 4 installed.
Figure 3:
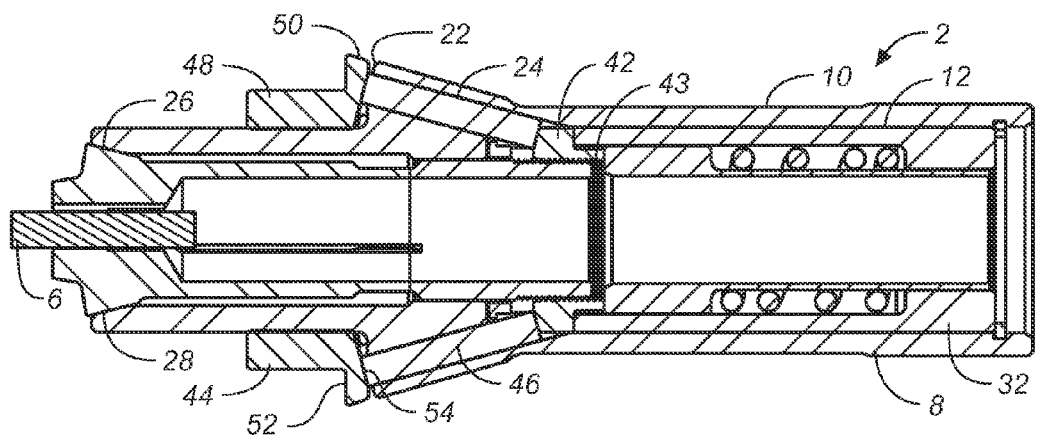
FIG. 3 is a cross sectional view of a collet adapter 2 taken from section A-A of FIG. 2.
Figure 4:
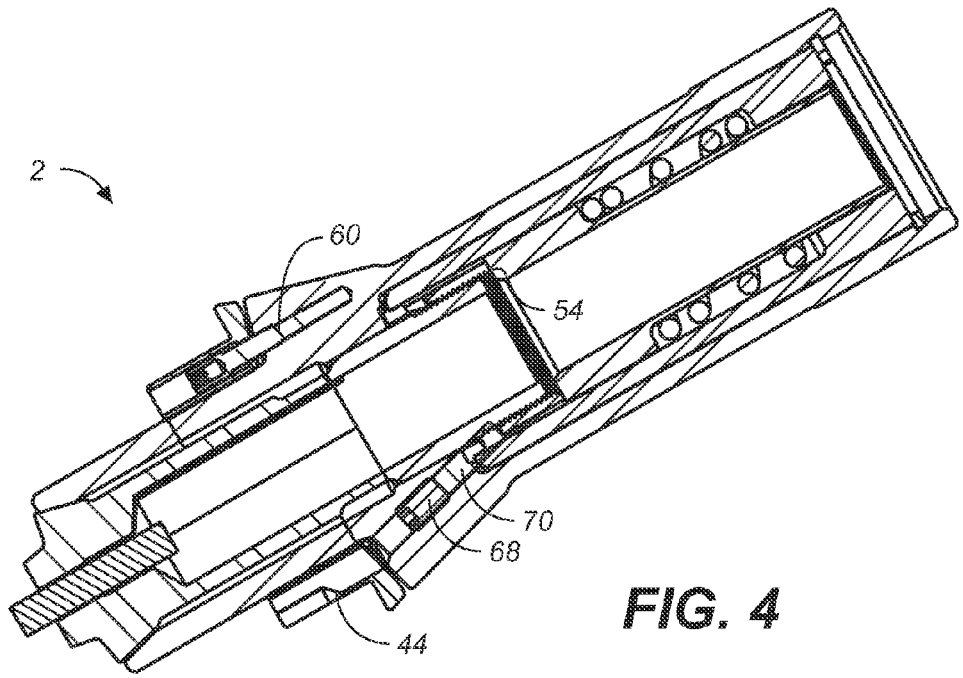
FIG. 4 is a cross sectional view of a collet adapter 2 taken from section B-B of FIG. 2.

FIGS. 1-5 depict a collet adapter 2 of the present invention. FIG. 1 is an isometric view of collet adapter 2 holding draw-in type collet 4. FIG. 2 is a front view of adapter 2 holding collet 4. FIG. 3 is a sectional view of adapter 2 holding collet 4 taken from section A-A of FIG. 2. FIG. 4 is a sectional view of adapter 2 holding collet 4 taken from section B-B of FIG. 2. Section 5 is an exploded view of adapter 2 holding collet 4.

Collet adapter 2 is configured to enable a relatively larger lathe to accommodate a small workpiece 6 and to machine an article thereby with high axial precision and to allow for machining of the workpiece very close to an axial zone of support. Collet adapter 2 is configured to receive a draw-in collet 4 and to fit into a spindle sleeve configured for an axially stationary collet. Thus, collet adapter 2 converts a relatively small draw-type collet 4 into a larger diameter stationary closure collet. Thus draw-in type collet 4 remains axially stationary relative to fixed portions of the spindle as collet 4 is being opened or closed. The use of the draw-in type collet 4 allows the cutting tools to access the workpiece 6 as close to the collet support as possible.

Referring to FIGS. 1 and 2, some directions and cylindrical coordinate axes are depicted including a Z-axis and radius R. Generally the Z-axis is disposed along the axis of rotation of a lathe spindle when collet adapter 2 is mounted in the spindle. The direction positive Z refers to a "forward" direction of removing a workpiece 6 from collet 4 which is the direction a spindle sleeve moves to close collet 4. The direction negative Z refers to a direction of placing workpiece 6 into collet 4 which is the direction that a spindle sleeve moves to open collet 4. The direction R refers to a radial direction that is perpendicular to the axis of rotation Z. An angular value of theta (not shown) concerns rotation about the axis of rotation Z.

Generally speaking this description will refer to "outside" surfaces and "inside" surfaces of various portions of adapter 2. Generally "inside" surfaces are those which at least partially enclose a cavity and/or have surface portions that face toward decreasing values of R. Opposing "outside" surfaces tend to face toward increasing values of R except where they are parallel to R.

Referring to FIGS. 1 and 3, adapter 2 includes adapter body 8 which defines an outside surface 10 and an inside surface 12. Outside surface 10 is configured to be received inside an axially moveable sleeve of a lathe spindle. Inside surface 12 is configured to receive collet 4 and contains components of adapter 2.

Figure 5:
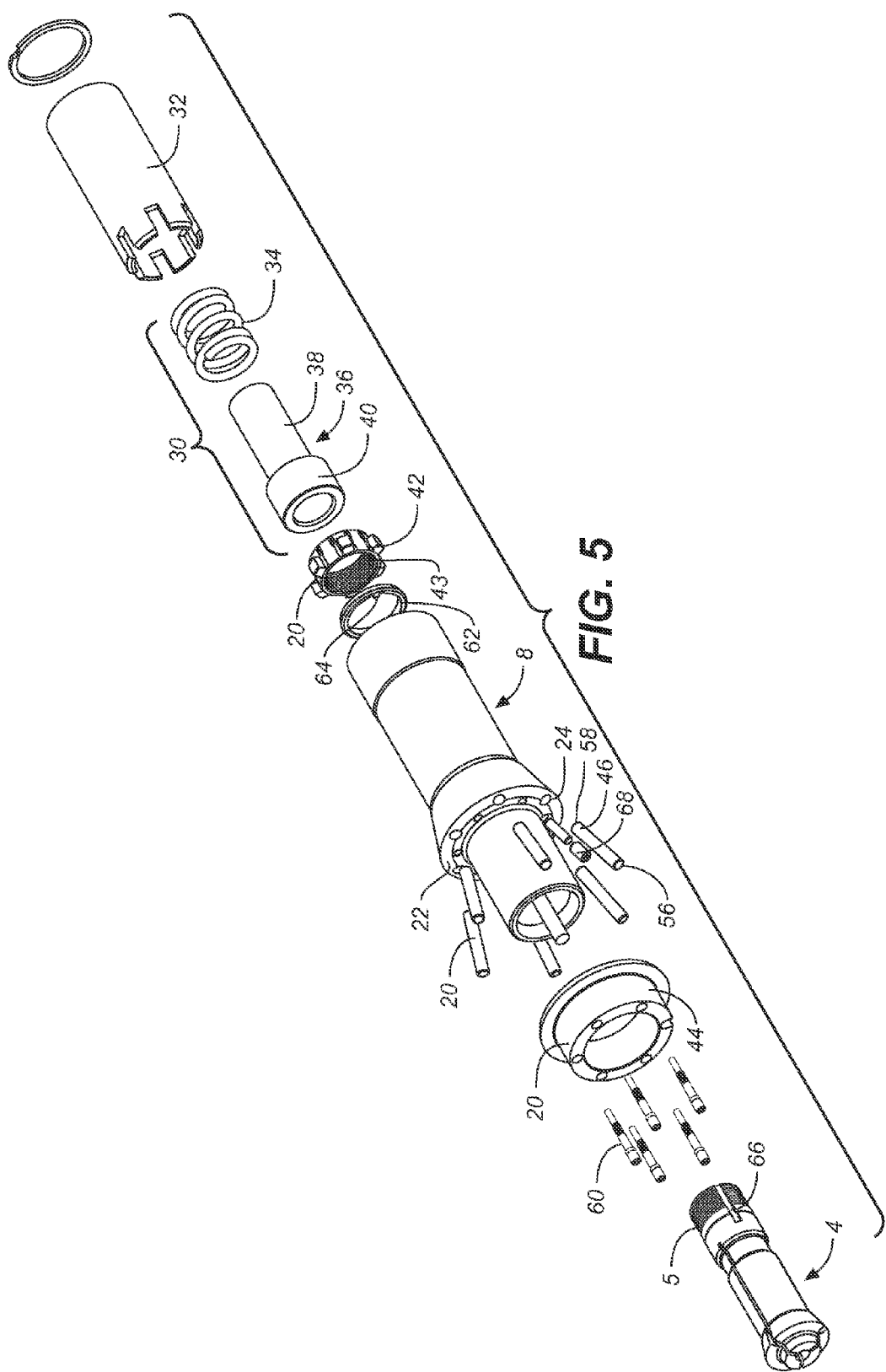
FIG. 5 is an exploded view of adapter 2 holding collet 4.

Referring to FIGS. 1 and 5, adapter body 8 includes a rearward portion 14, forward portion 16, and a flared portion 18 between rearward portion 14 and forward portion 16. Rearward portion 14 has an outer diameter that is greater than an outer diameter of forward portion 16. Flared portion 18 has an outer diameter that increases in a forward or +Z direction. Flared portion 18 slopes outwardly radially from rearward portion 14 and includes a circular face 22 at a forward end. Circular face 22 generally faces in the forward direction +Z.

Referring to FIGS. 3 and 5, a plurality of connecting holes 24 pass from circular face 22 to inside surface 12 of adapter body 8. The connecting holes 24 define openings on circular face 22 and define openings on the inside surface 12.

Inside surface 12 of adapter body 8 includes a tapered inside portion 26 that has an inside diameter that decreases in the rearward direction. Tapered portion 26 of inside surface 12 is configured to engage a flared portion 28 of collet 4 in order open and close collet 4 about workpiece 6.

Adapter body 8 moves rearward to open and forward to close collet 4. A spring assembly 30 (see FIG. 5 in particular) is configured to urge adapter body 8 rearward relative to collet 4. Spring assembly 30 (FIGS. 3 and 5) is disposed within thrust stop sleeve 32 which is also within the rearward portion of adapter body 8. Spring assembly 30 includes spring 34 and spacer tube 36. Spacer tube 36 has a rearward portion 38 and a forward portion 40. Forward portion 40 has a larger outer diameter than rearward portion 38. Spring 34 fits on the rearward portion 38 and is accommodated by a diametrical difference between the forward portion 40 and the rearward portion 38. Spring 34 generates an urging force between a rearward end of thrust stop sleeve 32 and forward portion 40 that in turn urges adapter body 8 in a rearward direction relative to collet 4. Thus spring 34 and spring assembly 30 urge the adapter body in a rearward direction that serves to open collet 4.

Referring to FIGS. 3 and 5, restraining apparatus 20 includes draw nut 42, thrust collar 44, and a plurality of thrust linkage rods 46. Draw nut 42 is configured to be threadedly mounted to a rearward portion of collet 4. Restraining apparatus 20 (FIG. 5) is configured to couple collet 4 to an axially fixed portion of a lathe spindle. In the illustrated embodiment, restraining apparatus 20 is an assemblage of machine parts that transmit a restraining force through adapter body 8 between an axially fixed portion of a spindle and collet 4. The restraining force maintains collet 4 in an axially stationary location as collet 4 is being closed by forward motion of adapter body 8.

The assemblage of machine parts 20 that define the restraining apparatus 20 transmit the restraining force by the cooperation of the individual parts including the draw nut 42 at one end of the assemblage 20 and the thrust collar 44 at the other end of the assemblage 20. The thrust linkage rods 46 transmit the restraining force between the thrust collar 44 and the draw nut 42. The thrust collar engages an axially stationary cap nut 78 (FIGS. 7 and 8) and the draw nut 42 engages collet threads 5 at a rearward portion 43 of collet 4. Thus the assemblage 20 thereby transmits the restraining force from the axially stationary cap nut 78 to the rearward portion 43 of collet 4.

Thrust collar 44 mounts to forward portion 16 (FIG. 1) of adapter body 8. Thrust collar 44 includes a forward portion 48 and rearward flange 50. Forward portion 48 of thrust collar 44 extends forwardly along the forward portion 16 of adapter body 8. Flange 50 extends radially outwardly and defines forward flange face 52 and rearward flange face 54. Forward flange face 52 is configured to engage a cap nut 78 on an axially fixed portion of a spindle.

Thrust linkage rods 46 are configured to transmit the restraining force from thrust collar 44 to the draw nut 42. Each thrust linkage rod 46 passes through and spans a connecting hole 24 (FIG. 5). Each thrust linkage rod 46 has a forward end 56 and a rearward end 58. The forward end 56 of each thrust linkage rod 46 is configured to engage rearward flange face 54. The rearward end 58 of each thrust linkage rod is configured to engage draw nut 42. Thus, as part of assemblage 20, the thrust linkage rods 46 transmit the restraining force through adapter body 8.

Referring to FIGS. 4 and 5, adapter 2 includes mounting posts 60 that couple thrust collar 44 to adapter body 8. Adapter 2 also includes a keying ring 62 including a radially inwardly projecting tab 64 configured to engage a slot 66 in collet 4. Tightening set screw 68 applies a force on pressure pellet 70 which in turn rotationally locks keying ring 62 into position. This constrains the relative motion of adapter body 8 and collet 4 to axial motion due to the tab 64 and slot 66 interaction.

Referring to FIG. 3, an engagement between thrust stop sleeve 32 and draw nut 42 puts a limit on closure of collet 4. The amount of maximum closure is determined according to the position of draw nut 42 upon collet threads 5 (FIG. 5 also). The keying ring 62 is used to set this maximum closure. The tab 64 prevents rotation about axis Z when the set screw 68 is tightened, thus maintaining a maximum closure setting.

Figure 6:
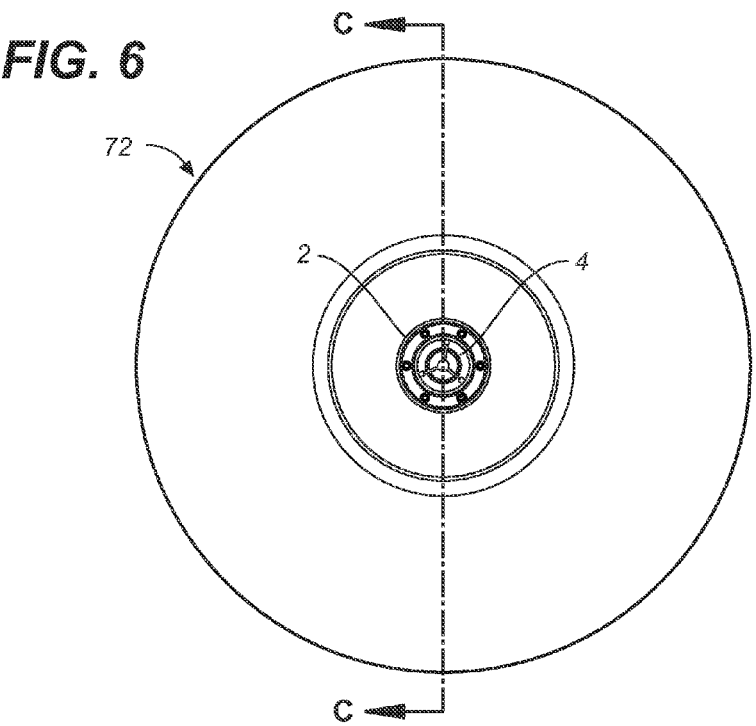
FIG. 6 is a front view of a spindle 72 having collet adapter 2 with collet 4 installed.
Figure 7:
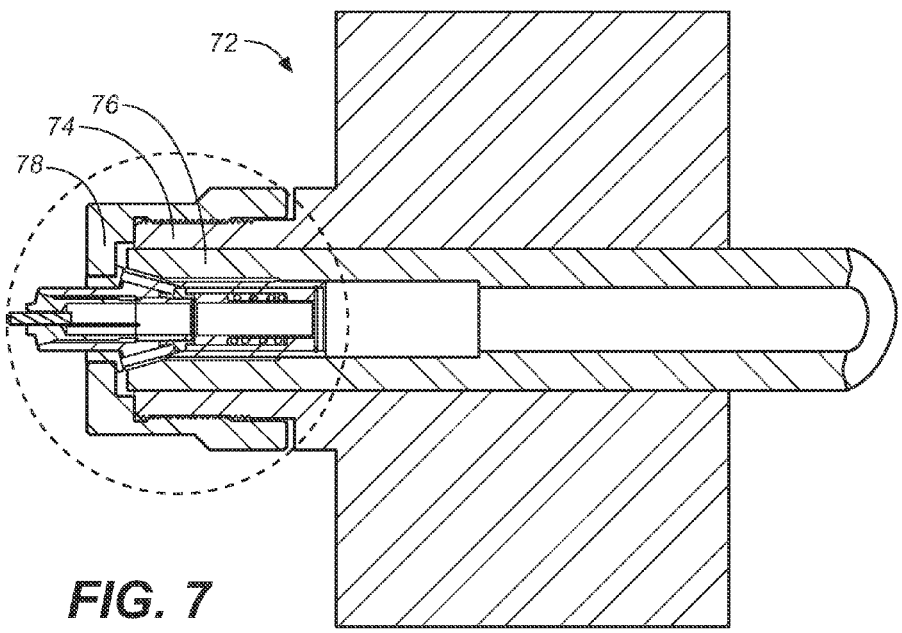
FIG. 7 is a cross sectional view of spindle 72 taken from section C-C of FIG. 6.
Figure 7A:
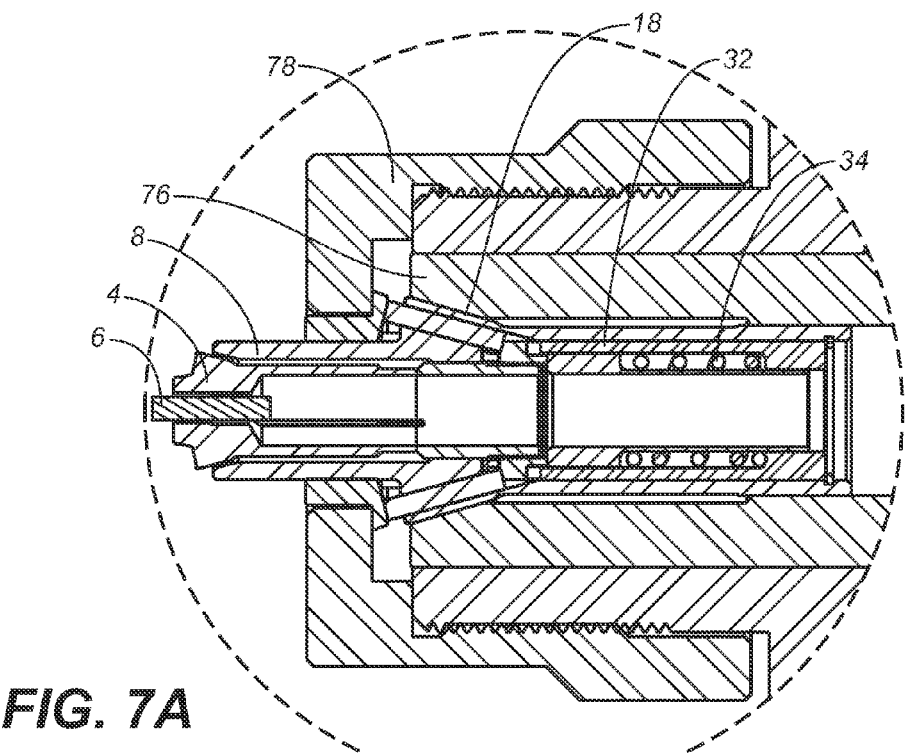
FIG. 7A is a detail view taken from FIG. 7 depicting the collet 4 in an open state.
Figure 7B:
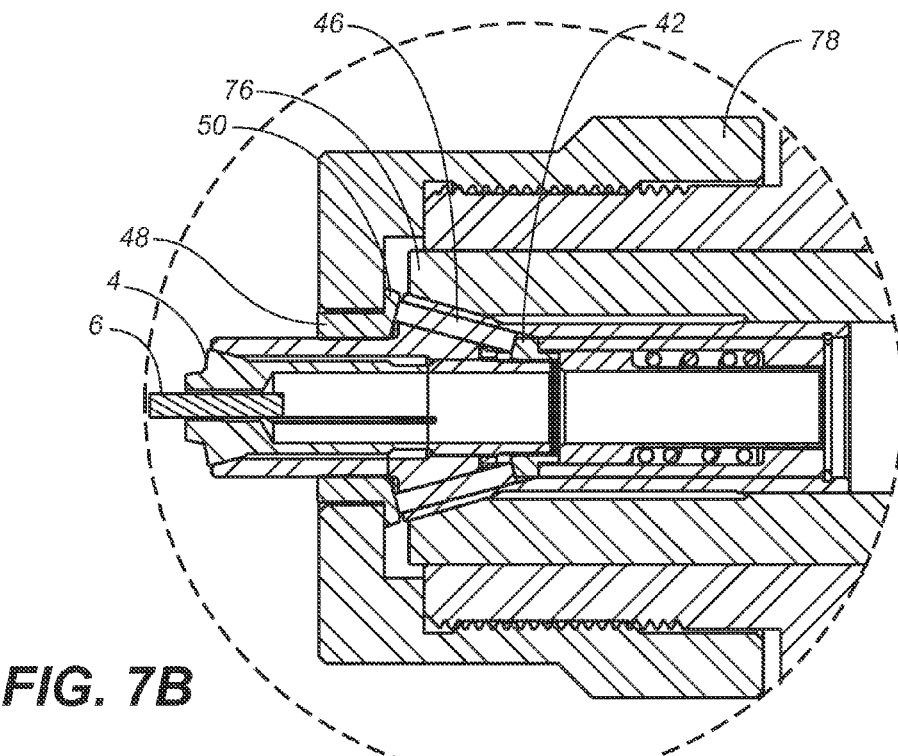
FIG. 7B is a detail view taken from FIG. 7 depicting the collet 4 in a closed state.
Figure 8A:
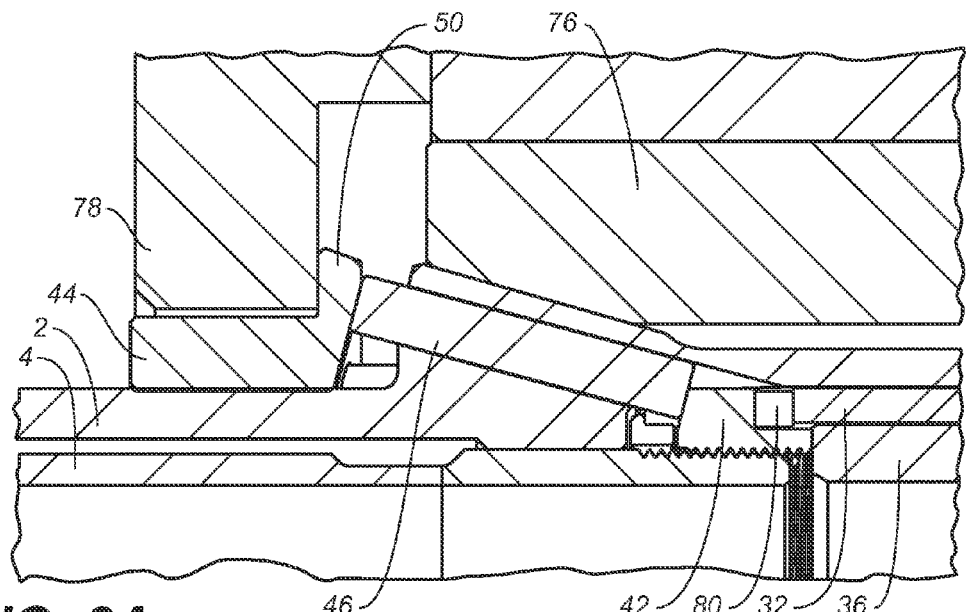
FIG. 8A is a detail view taken from FIG. 7A depicting the interactions between portions of the adapter.
Figure 8B:
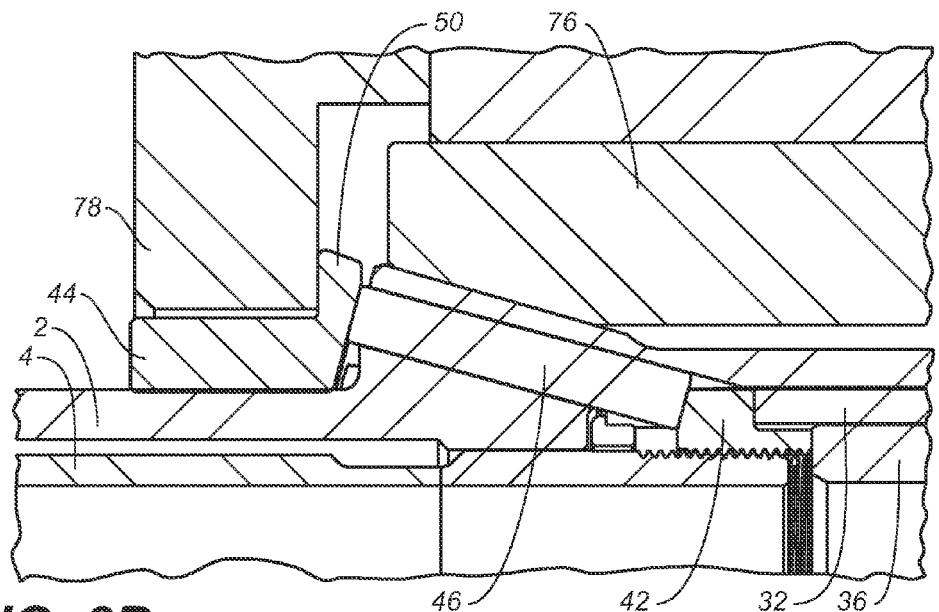
FIG. 8B is a detail view taken from FIG. 7B depicting the interactions between portions of the adapter.
Figure 9A:
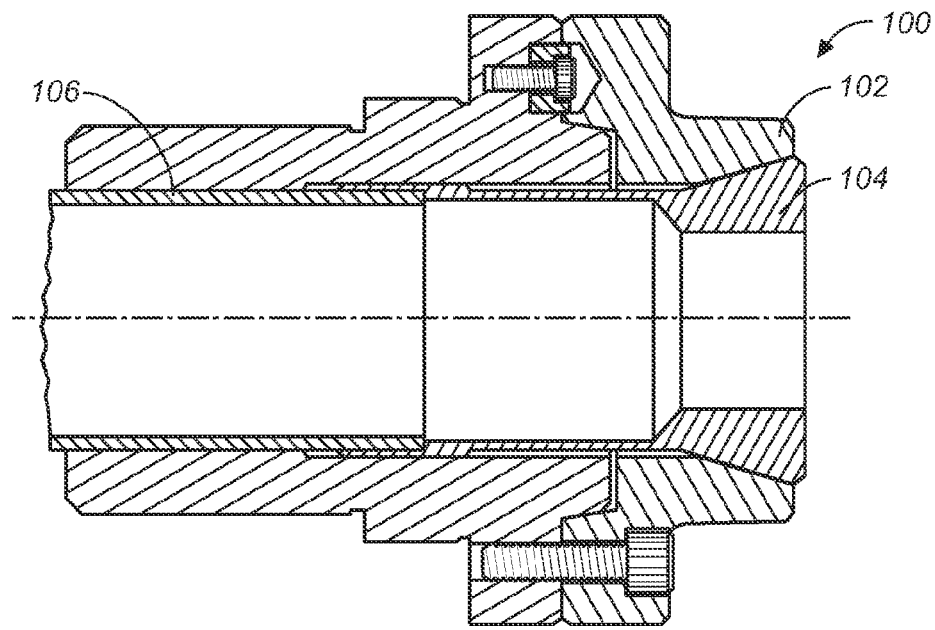
FIG. 9A is a cross sectional view illustrating a draw-in type collet 104 installed in a spindle 100.
Figure 9B:
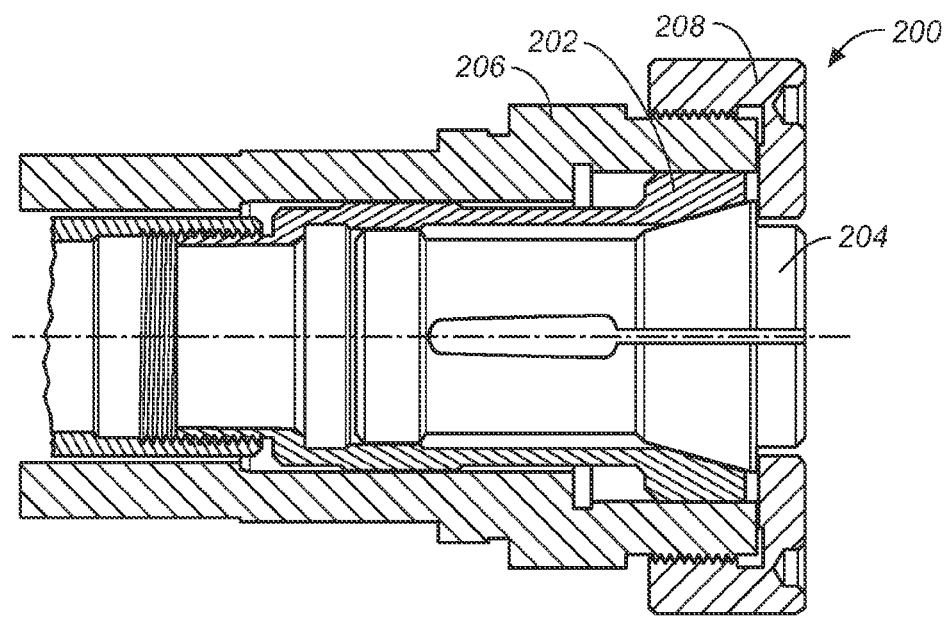
FIG. 9B is a cross sectional view illustrating an axially stationary type collet installed in spindle 200.

FIGS. 6, 7, 7A, 7B, 8A, and 8B depict collet adapter 2 installed in the spindle of a lathe. FIG. 6 depicts a front view of spindle 72 with collet adapter 2 having collet 4 installed. FIG. 7 is a cross sectional view taken from section C-C of FIG. 6. FIG. 7A is a detailed view taken from FIG. 7 with collet 4 in the open state in which workpiece 6 can be easily inserted and removed from collet 4. FIG. 7B is a detailed view taken from FIG. 7 with collet 4 in a closed state in which workpiece 6 is firmly clamped in collet 4. FIGS. 8A and 8B are further detailed views taken from FIGS. 7A and 7B respectively to provide a more detailed view of the interaction of various portions of the illustrated system.

Referring to FIG. 7, spindle 72 includes an outer portion 74 that is axially stationary and spindle sleeve 76 that is axially movable within outer portion 74. The axially stationary outer portion 74 also includes a cap nut 78 that is attached to spindle 72 through inter-engaged screw threads. Thus cap nut 78 forms a portion of the axially stationary portion 74 of spindle 72.

Preparing the adapter and collet for use: The collet 4 is first assembled to the adapter 2. Refer now to FIG. 5. The collet 4 is assembled to the adaptor 2 by linearly inserting the collet 4 into adapter 2 and then rotating the collet 4 clockwise. As the collet 4 is linearly inserted into adapter body 8, tab 64 extending from keying ring 62 engages slot 66 in collet 4. Keying ring 62 is initially free to rotate. When collet 4 is rotated clockwise, outer threads 5 on collet 4 engage inner threads 43 on draw nut 42.

The progressive clockwise engagement determines the location of draw nut 42 upon collet threads 5. The location of draw nut 42 upon collet 4 constrains a distance axial of motion between adapter 2 and collet 4. Thus, the draw nut location determines the maximum closure of collet 4. This can be quite important for very small diameter delicate parts that may become damaged if the closure force of collet 4 is too high. Therefore the axial location of draw nut 42 upon collet 4 is fixed by the action of set screw 68, pressure pellet 70, and keying ring 62.

When the threads 5 and 43 are properly engaged to provide an optimal closure of collet 4, the set screw 68 is turned clockwise; the set screw bears inwardly on pressure pellet 70 which in turn bears inwardly upon keying ring 62 to lock it in place so that it cannot rotate about axis Z. Locking keying ring 62 in place constrains relative motion between collet 4 and adapter body 8 to the axial direction Z due to the action of tab 64 in slot 66. Thus the collet 4 is thereby assembled to the adapter 2.

Preparing the spindle for use (refer to FIG. 7): The cap nut is 78 is unscrewed and removed from spindle 72. Next, the rearward portion 14 (FIG. 1) of adapter 2 is then linearly placed into spindle sleeve 76. Finally, the cap nut 78 is screwed back on to spindle 72.

FIGS. 7A and 7B depict open and closed states of collet 4. According to FIG. 7A, spring 34 exerts a force between collet 4 and adapter body 8 thereby urging adapter body in a rearward (−Z) direction. This leaves collet 4 open such that workpiece 6 may be inserted. Referring to FIG. 8A there is initially a gap 80 between draw nut 42 and thrust stop sleeve 32. The location of draw nut 42 upon collet 4 defines gap 80. This gap defines an allowed range of axial motion of adapter body 2 with respect to collet 4 and thereby defines the maximal closure of collet 4.

The lathe grips the workpiece 6 by propelling the spindle sleeve 76 in a forward direction. As spindle sleeve 76 moves forward (+Z direction), it engages the flared portion 18 of adapter body 8. Once engaged spindle sleeve 76 and adapter body 8 move forward together. As adapter body 8 moves forward the tapered inside surface 26 of adapter body 2 slidingly engages flared portion 28 of collet 4, putting radially inward pressure on collet 4 (since collet 4 is axially stationary). Thus collet 4 closes upon workpiece 6 as depicted in FIG. 7B.

Comparison of FIGS. 8A and 8B illustrate the effect of forward motion of adapter body 8 under the influence of spindle sleeve 76. The forward motion is relative to stationary elements including cap nut 78, thrust collar 44, thrust linkage rods 46, draw nut 42, and collet 4. Initially there is a gap 80 defined between thrust stop sleeve 32 and draw nut 42. During forward motion the thrust stop sleeve 32 moves forward until it engages draw nut 42. Once thrust stop sleeve 32 is engaged with draw nut 42 the forward motion of adapter body 8 is thereby halted. Thus the initial gap 80 defines the extent of the forward motion and hence defines a controlled and maximal closure of collet 4.

As adapter body 8 is being pushed forward by spindle sleeve 76 the restraining apparatus 20 (FIG. 5) restrains motion of collet 4 so that collet 4 remains stationary in axial direction Z. Restraining apparatus 20 is axially coupled to cap nut 78 (part of the fixed portion 74 of spindle 72) and to collet 4.

In the illustrated embodiment restraining apparatus 20 (FIG. 5) includes an assemblage including draw nut 42, thrust linkage rods 46, and thrust collar 44 (see also FIG. 3). This assemblage 20 transmits a restraining force from cap nut 78 to collet 4 to prevent axial motion of collet 4 while collet 4 is being closed. The restraining force is transmitted from cap nut 78 to radially extending flange 50 of thrust collar 48 to linkage rods 46 to draw nut 42 which in turn secures the axial location of collet 4.

Stated another way: (1) the collet is held in place by an axial counter force exerted by draw nut 42; (2) the counter force is imparted to the draw nut 42 by thrust linkage rods 46; (3) thrust linkage rods 46 are abutted against a bearing surface provided by radially extending flange 50 of thrust collar 48; radially extending flange 50 of thrust collar 48 is abutted against cap nut 78.

The lathe releases the workpiece 6 by propelling the spindle sleeve in a backward (−Z) direction. The spring 34 can now push the adapter body 8 in a backward (−Z) direction thus allowing the collet 4 to open.

While all of the fundamental features and characteristics of the collet adapter 2 have been disclosed and described, with reference to particular embodiments thereof, a latitude of modification is envisioned. Various changes and substitutions are intended in the foregoing disclosure and it will be apparent that some features of the invention will be employed without a corresponding use of other features without departing from the scope of the invention as set forth. It should be understood that such substitutions, modifications, and variations may be made by those skilled in the art without departing from the spirit or scope of the invention. Consequently all such modifications and variations are included in the scope of the invention as defined thereof except as defined by the claims.

I claim:

1. A collet adapter for adapting a machine spindle to a small draw-type collet, the draw-type collet including a forward portion for receiving a workpiece and a rearward portion extending into the collet adapter, the machine spindle having an axially stationary outer portion including a cap nut and an axially movable sleeve inside the axially stationary outer portion, the collet adapter comprising:

an adapter body having an inside surface and an outside surface, the inside surface configured to receive the collet in sliding engagement, the outside surface configured to be received into and to move axially with the moveable sleeve; and a restraining apparatus configured to transmit an axial force from the cap nut to the rearward portion of the draw-type collet to restrain forward axial motion of the draw-type collet whereby forward motion of the adapter body exerts a radially inward force upon the draw-type collet thereby operating the draw-type collet in an axially stationary mode wherein the adapter body has a rear portion sized to fit into the moveable sleeve and a forward portion configured to extend in a forward direction beyond the moveable sleeve to allow a workpiece to be gripped beyond the fixed portion of the machine spindle and wherein the rear portion of the collet adapter has a rear outside diameter, the forward portion of the collet adapter has a forward outside diameter, and the rear outside diameter is greater than the forward outside diameter.

2. The collet adapter of claim 1 further comprising a spring assembly contained within the rear portion of the adapter body configured to urge the collet in a forward direction with respect to the adapter body.

3. The collet adapter of claim 1 wherein further comprising an apparatus that restrains forward motion of the collet adapter in order to limit closure of the collet to a fixed amount.

4. A collet adapter for adapting a machine spindle to a small draw-type collet, the draw-type collet including a forward portion for receiving a workpiece and a rearward portion extending into the collet adapter, the machine spindle having an axially stationary outer portion including a cap nut and an axially movable sleeve inside the axially stationary outer portion, the collet adapter comprising:

an adapter body having an inside surface and an outside surface, the inside surface configured to receive the collet in sliding engagement, the outside surface configured to be received into and to move axially with the moveable sleeve; and a restraining apparatus configured to transmit an axial force from the cap nut to the rearward portion of the draw-type collet to restrain forward axial motion of the draw-type collet whereby forward motion of the adapter body exerts a radially inward force upon the draw-type collet thereby operating the draw-type collet in an axially stationary mode wherein the adapter body has a rear portion sized to fit into the moveable sleeve and a forward portion configured to extend in a forward direction beyond the moveable sleeve to allow a workpiece to be gripped beyond the fixed portion of the machine spindle and wherein the adapter body includes a flared portion between the rear portion and the forward portion, the outside diameter of the flared portion increases in the forward direction, the flared portion is complementary to an inside surface of the moveable sleeve whereby engagement between an inside surface of the moveable sleeve and the flared portion compels forward motion of the adapter body.

5. The collet adapter of claim 4 wherein an outside surface of the flared portion includes a circular face between the flared portion and the forward portion.

6. A collet adapter for adapting a machine spindle to receive a small collet, the machine spindle having an axially stationary outer portion and an axially movable sleeve configured to move axially within the axially stationary outer portion, the collet adapter comprising:

an adapter body having an inside surface and an outside surface, the inside surface configured to receive a collet, the outside surface configured to be received into and to move axially with the moveable sleeve; and a restraining apparatus configured to transmit a restraining force through the adapter body from a forward portion of the axially fixed outer portion of the spindle to a rearward portion of the collet to restrain axial motion of the collet during forward motion of the adapter body whereby forward motion of the adapter body closes the collet upon a workpiece while the collet remains axially stationary wherein the adapter body has a rear portion sized to fit into the moveable sleeve and a forward portion configured to extend in a forward direction beyond the moveable sleeve to allow a workpiece to be gripped beyond the fixed portion of the machine spindle and wherein the adapter body includes a flared portion between the rear portion and the forward portion, the outside diameter of the flared portion increases in the forward direction, the flared portion is complementary to an inside surface of the moveable sleeve whereby engagement between an inside surface of the moveable sleeve and the flared portion compels forward motion of the adapter body.

7. The collet adapter of claim 6 wherein the outside surface of the flared portion includes a circular face between the flared portion and the forward portion.

8. A collet adapter for adapting a machine spindle to receive a small collet, the machine spindle having an axially stationary outer portion and an axially movable sleeve configured to move axially within the axially stationary outer portion, the collet adapter comprising:

an adapter body having an inside surface and an outside surface, the inside surface configured to receive a collet, the outside surface configured to be received into and to move axially with the moveable sleeve; and a restraining apparatus configured to transmit a restraining force through the adapter body from a forward portion of the axially fixed outer portion of the spindle to a rearward portion of the collet to restrain axial motion of the collet during forward motion of the adapter body whereby forward motion of the adapter body closes the collet upon a workpiece while the collet remains axially stationary wherein the restraining apparatus includes a plurality of thrust linkage rods that transmit the restraining force through the adapter body.

9. The collet adapter of claim 8 wherein the fixed outer portion of the machine spindle includes a cap nut, the restraining apparatus includes a thrust collar having a flange that transmits the restraining force from the cap nut to the thrust linkage rods.

10. The collet adapter of claim 8 wherein the restraining apparatus includes a draw nut that couples to the rearward portion of the collet and receives the restraining force from the linkage rods.

11. A collet adapter for adapting a machine spindle to a small collet, the machine spindle including an axially stationary outer portion and an axially movable sleeve inside the axially stationary outer portion, the axially stationary outer portion further including a cap nut, the collet adapter comprising:

an adapter body having an inside surface configured to receive a collet and an outside surface configured to be received into the machine spindle sleeve whereby the adapter body is constrained to move with a forward motion of the spindle sleeve;

a draw nut configured to couple to threads on an outside surface of the collet; and a plurality of thrust linkage rods each having opposing ends whereby a first end of each linkage rod transfers a force to the cap nut and a second end of each thrust linkage rod engages the draw nut thereby transferring a force between the draw nut to the cap nut to restrain axial movement of the collet during forward motion of the adapter body.

12. The collet adapter of claim 11 wherein the adapter body has a rear portion sized to fit into the moveable sleeve and a forward portion configured to extend in a forward direction beyond the moveable sleeve to allow a workpiece to be gripped beyond the fixed portion of the machine spindle.

13. The collet adapter of claim 12 wherein the adapter body includes a flared portion between the rear portion and the forward portion, the outside diameter of the flared portion increases in the forward direction, the flared portion is complementary to an inside surface of the moveable sleeve whereby engagement between an inside surface of the moveable sleeve and the flared portion compels forward motion of the adapter body.

14. The collet adapter of claim 13 wherein an outside surface of the flared portion includes a circular face between the flared portion and the forward portion.

15. The collet adapter of claim 14 further comprising a thrust collar configured to engage the cap nut when the collet adapter is installed into the machine spindle whereby the first end of each linkage rod engages the thrust collar.

16. The collet adapter of claim 14 wherein a plurality of connecting holes pass through the adapter, each connecting hole extends from an inside surface of the adapter body adjacent to the draw nut to the circular face, each of the thrust linkage rods passes through one of the connecting holes.

17. The collet adapter of claim 16 wherein each of the connecting holes projects at an angle relative to the forward direction so as to generally follow a geometry of the outside surface of the flared portion of the adapter body.

18. The collet adapter of claim 15 wherein the thrust collar fits over the forward portion of the adapter body, the thrust collar has a radially extending flange with a rear surface and a forward surface, the rear surface of the radial flange faces the circular face of the flared portion and engages the first end of each thrust linkage rod, and the forward surface engages the cap nut to transmit the restraining force from the cap nut to each thrust linkage rod.

19. The collet adapter of claim 11 further comprising a thrust stop sleeve disposed within the adapter body between a rearward end of the adapter body and the draw nut wherein a gap is defined between the draw nut and a forward end of the thrust stop sleeve when the collet is in an open state, the gap defines a maximal forward axial motion of the adapter body which limits closure of the collet.

20. The collet adapter of claim 19 wherein a position of the draw nut upon the collet is adjusted by rotation of the draw nut and determines the gap.

21. The collet adapter of claim 20 further comprising a keying ring having a locking tab, the keying ring configured to engage a slot in the collet whereby locking rotational motion of the keying ring thereby locks the axial location of the draw nut upon the collet.

* * * * *